(12) United States Patent
Janniello (10) Patent No.: US 6,292,887 B1
(45) Date of Patent: Sep. 18, 2001

(54) SYSTEM AND METHOD FOR SYNCHRONIZING INSTRUCTION EXECUTION WITH EXTERNAL EVENTS

(75) Inventor: James P. Janniello, Fairfield, CT (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/282,700

(22) Filed: Mar. 31, 1999

(51) Int. Cl.[7] .............................. G06F 9/308; G06F 9/30; G06F 9/32
(52) U.S. Cl. .......................... 712/223; 712/244; 712/245; 712/213
(58) Field of Search .................................... 711/137, 183; 712/245, 237, 243, 244, 228, 213, 248, 227, 209, 217, 223, 224; 707/3; 700/102

(56) References Cited

U.S. PATENT DOCUMENTS 3,928,857 * 12/1975 Carter et al. ...................... 711/137
4,445,177 * 4/1984 Bratt et al. ........................ 712/245
5,216,613 * 6/1993 Head, III .......................... 700/102

* cited by examiner

Primary Examiner—Daniel H. Pan
(74) Attorney, Agent, or Firm—Louis J. Percello; Fitch, Even, Tabin & Flannery

(57) ABSTRACT

An apparatus and method of synchronizing instruction execution in the apparatus with external events. The apparatus may be a processor or microprocessor capable of executing a function specific wait state that is dependant upon a type specified by an instruction field. The processor includes an event counter that maintains an event occurrence count, an instruction parser that strips the instruction type and event count from instructions and passes the stripped information to a comparator. The comparator compares the stripped information against an event count. The instruction types include: a relative type indicating execution at some event occurrence subsequent to the present cycle; a direct type indicating an absolute event occurrence count for execution; and a event range indicating a range of event occurrences wherein execution is valid.

24 Claims, 7 Drawing Sheets

SYSTEM AND METHOD FOR SYNCHRONIZING INSTRUCTION EXECUTION WITH EXTERNAL EVENTS

RELATED APPLICATION

The present invention is related to U.S. patent application Ser. No. 09/282,712 entitled "System and Method for Temporally Controlling Instruction Execution" to Janniello, assigned to the assignee of the present invention.

BACKGROUND OF THE INVENTION

1. Field of the Invention

The present invention is related to computer processors and, more particularly, to synchronizing instruction execution in a microprocessor or digital signal processor with external events.

2. Background Description

So-called superscalar Microprocessors and Digital Signal Processors operate by sequentially executing instructions which specify the individual operations, These sequential operations can include, for example, adding two numbers, subtracting numbers, multiplying numbers, moving data, performing boolean math, etc. A typical program for a microprocessor is, basically, a sequence of instructions written to perform a particular task.

Some program instructions may reorder instruction execution sequence on the fly. For example, a short sequence of instructions may be executed repeatedly or, under a given set of conditions, a block of instructions may be skipped altogether. Typical instructions to modify the sequence of instructions after execution has begun may include, for example, LOOP and JUMP instructions.

Each instruction may include several fields, each of which is necessary to complete execution. These fields may include, for example, the operands for math operations, an address of an operand stored in memory, the register name holding an operand, the location of the next instruction to be executed, the number of times to execute an instruction loop. The processor parses each instruction, to determine instruction type and to determine the number of fields in the instruction and the definition of each field. Then, the processor instructs appropriate functional units to execute their operation causing, for example, an addition unit to add two numbers or, causing a multiplier to multiply two numbers. As each instruction is executed, the processor fetches or reads, the next instruction from memory and executes it.

Instruction execution speed is limited only by the speed of the underlying hardware. Often, however external events may affect program execution or, the program may be event-driven. These external events may include, for example, striking a key on a keyboard or responding to a flag from a digital timer.

In some instances program execution must be controlled temporally, or paced. For example, a sample may be read periodically from a monitoring device, such as monitoring combustion within an engine. In this example, a digital timer is programmed to periodically expire and generate a flag that interrupts the processor. Then, the processor begins executing a subroutine to read the monitoring device. This type of program execution is acceptable when timer accuracy and interrupt handling time requirements are not particularly stringent.

However, for applications where timing tolerances are such that event timing must be to within a single microprocessor clock cycle, these prior art program execution methods are no longer acceptable. In particular, for example, these prior art methods are unsatisfactory when temporal precision is important such as, for video compression/decompression. Here, large amounts of data may need to be stored, transported and displayed. Consequently, to reduce the video data volume, redundant information is commonly removed from the video, compressing the video data. Unfortunately, when the redundant information is removed, the temporal characteristic of the video content may he changed, with the real-time nature of the video material being lost.

So, normally, when the video is decompressed, timestamps are embedded into the video content to maintain the temporal relationship. A typical timestamp is, essentially time of day. The timestamps specify when a particular block of video data (most typically, a video frame) should be decompressed and/or displayed. As the video is compressed, the time of day is inserted into the compressed video content. When the video is decompressed, the timestamp is fetched by the decompression processor and provides a guide indicating when the video frame should be displayed. Thus, the timestamp information, embedded in the data, temporally controls processor execution This timestamp method enables linking program control and execution to time.

Another prior art method for temporally controlling program execution uses a digital timer. The digital timer is set to count to or expire at a particular time at which point the timer issues a flag that indicates the time has expired. The processor is programmed to enter a no-op loop until the digital timer reaches the expiration count. The processor continues executing the no-op loop until the timer reaches the count, when the flag is issued. The flag signals to the processor to interrupt the loop and to jump to another subroutine or program location.

While these methods control program execution, maintaining responsiveness to external events, they also are relatively inaccurate, and their responsiveness depends, for example, upon the time to initialize the timer and to complete the interrupt operation, which may vary significantly. Furthermore, where precision to within a single microprocessor clock cycle is needed, these methods are unacceptable.

SUMMARY OF THE INVENTION

It is a purpose of the invention to enable programmers to precisely control execution timing in response to external events.

It is another purpose of the present invention to enable programmers to precisely link execution of computer programs to external events.

The present invention is an apparatus and method of synchronizing instruction execution in the apparatus with external events. Accordingly, the preferred apparatus is a processor or microprocessor capable of executing a function-specific wait-state in response to the occurrence of a particular external event. The type of function-specific wait-state is dependant upon a type specified by an instruction field. The microprocessor includes an event counter that maintains an event occurrence count, an instruction parser that strips the instruction type and event count from instructions and passes the stripped information to a comparator. The comparator compares the stripped information against an event count. The instruction types include: a relative type indicating execution at some event occurrence subsequent to the present cycle; a direct type indicating an absolute event occurrence count for execution; and an event range indicating a range of event occurrences wherein execution is valid.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
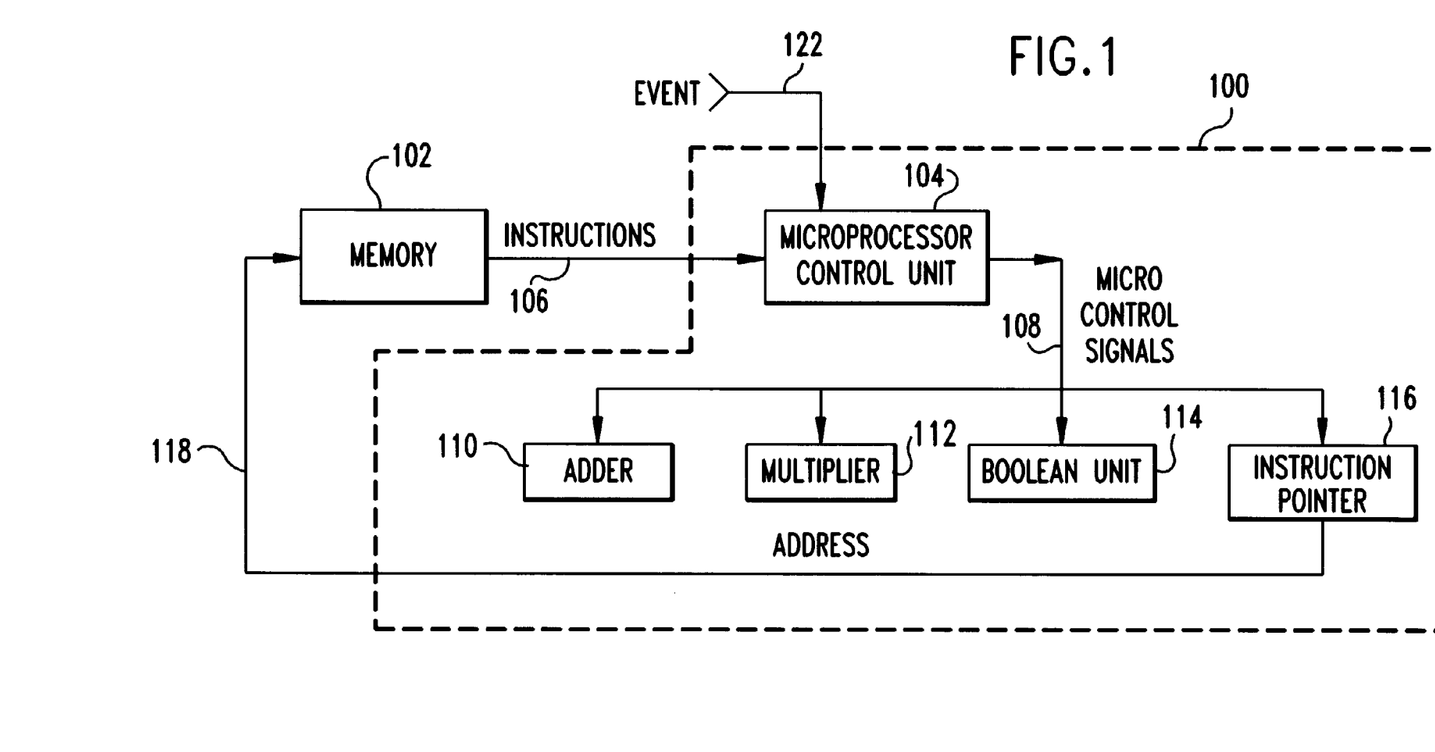
FIG. 1 is a simplified block diagram of a preferred embodiment microprocessor and memory.

Referring now to the drawings and, more particularly, FIG. 1 is a simplified block diagram of a microprocessor 100 and memory 102. A Microprocessor Control Unit (MPCU) 104 fetches instructions from the memory 102 on instruction bus (Ibus) 106. After parsing the instructions, the MPCU 104 generates Micro Control Signals which are passe on Micro Control Signals bus ($\mu$CSbus) 108 to various functional units 110, 112, 114 and to Instruction Pointer 116, which provides an address on address bus 118 for the next instruction to be executed. Event occurrences are provided directly to MCPU 104 on event input 122. Events may include a numerical count, numerical data or a response to some physical occurrence.

Figure 2:
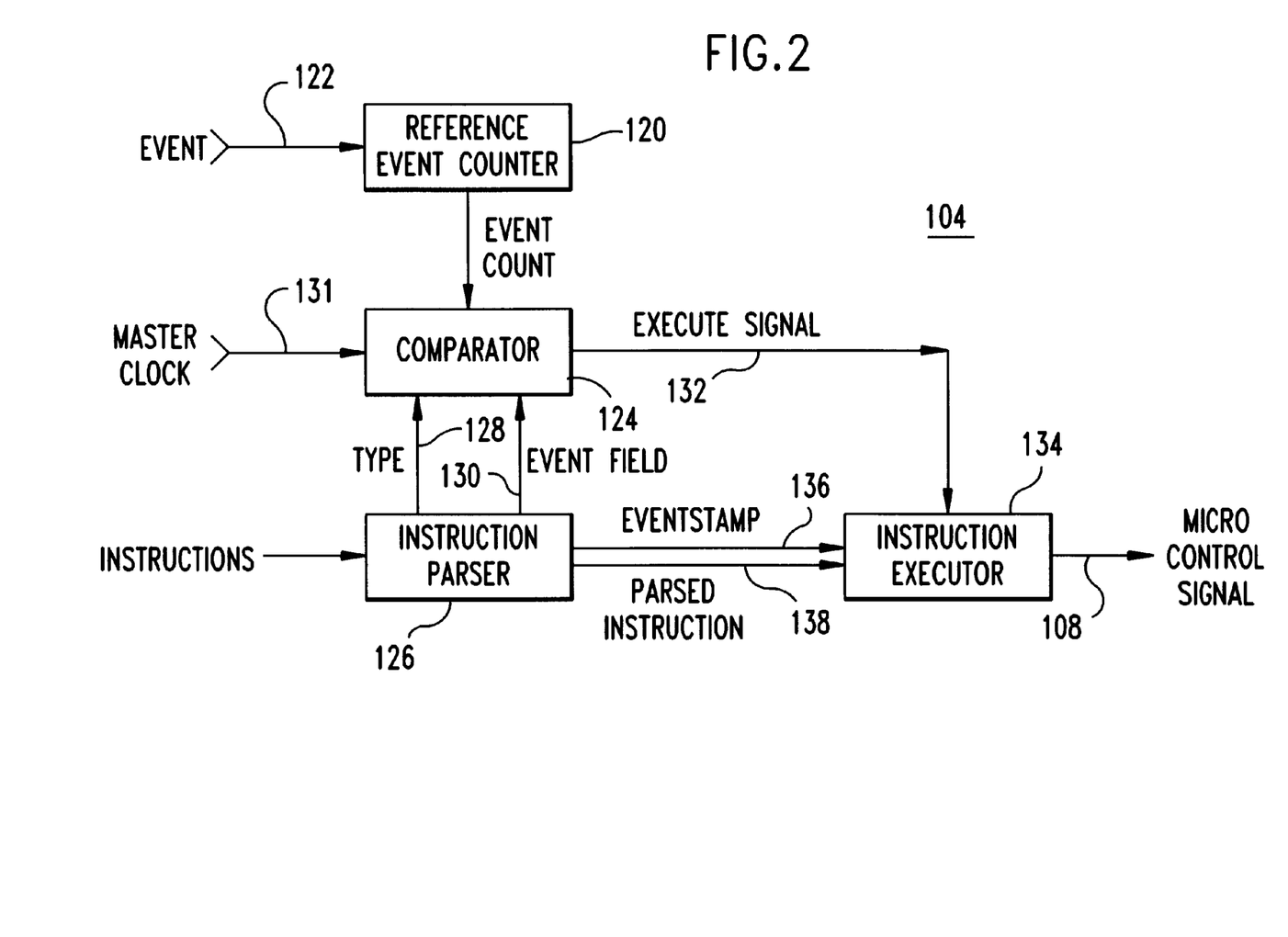
FIG. 2 is a detailed example of a preferred embodiment microprocessor control unit (MPCU)

FIG. 2 is a detailed example of a preferred embodiment MPCU 104. Reference Event Counter 120 is a multi-bit counter that increments on every event occurrence at Event input 122. The Reference Event Counter 120 is initialized at program start and maintains a Reference Event count, RE count. Comparator 124 monitors the Reference Event Counter 120. Instruction Parser 126 parses instructions, stripping off eventstamp information from eventstamped instructions.

When such an eventstamped instruction is encountered, the Instruction Parser 126 strips off a TYPE field and a EVENT field, both of which are provided to comparator 124 on lines 128, 130, respectively. The TYPE field 128 is combined with the EVENT field 130 to indicate exactly when to execute the instruction. For the preferred embodiment, there are three possible event types: a Direct type, a Range type and a Relative type, although it is contemplated that additional event types may be included, if desired. The comparator 124 continuously compares the EVENT Field on lines 130 to the count value in the Reference Event Counter 120.

If the TYPE field 128 indicates a Direct type, then, when the EVENT field on lines 130 equals the RE count, the comparator 124, clocked by master clock 131, drives the Execute Signal on line 132 active. If the RE count and the EVENT field 130 are equal, then, the processor executes the instruction immediately, during the current clock cycle. If they are not equal, the processor executes a no-op, waiting until the specified event occurs and, then, drives an Execute Signal on line 132 active.

If the TYPE field 128 indicates a Range type, then, the processor has been given an event count range in which the instruction may be executed. So, when the RE count equals or is between the range limits EVENT_L or EVENT_H Field on lines 130, the Comparator 124 drives the Execute Signal on line 132 active, The EVENT_L field indicates the lowest count at which the instruction may be executed. The EVENT_H field indicates the highest count at which the instruction should be executed.

If the TYPE field 128 indicates a Relative type, then, the processor is to execute the instruction some number of event occurrences, as indicated by the EVENT field 130, after the current event.

In response to the Execute Signal on line 132, the Instruction Executor 134 generates Micro Control Signals from the Eventstamp on line 136 in combination with the parsed instruction on lines 138. The Instruction Executor 134 places the Micro Control Signals on $\mu$CSbus 108 and selectively activates Functional Units 110, 112 and 114. If the Eventstamp signal line 136 is active indicating the instruction contains a eventstamp, the Instruction Executor 134 does not place the Micro Control Signals on the $\mu$CSbus 108 until the Execute Signal is active; otherwise, the Micro Control Signals are placed on the $\mu$CSbus 108 immediately.

In one preferred embodiment, the Instruction Executor 134 is a microprogram read only memory ($\mu$P ROM) providing the Micro Control Signals on $\mu$CSbus 108. The Eventstamp on line 136 in combination with the parsed instruction on lines 138 are address lines of the $\mu$P ROM, addressing microcode instructions. Alternately, the Eventstamp on line 136 may be combined, logically, with the parsed instruction on lines 138 to generate microinstruction addresses.

Figure 3:
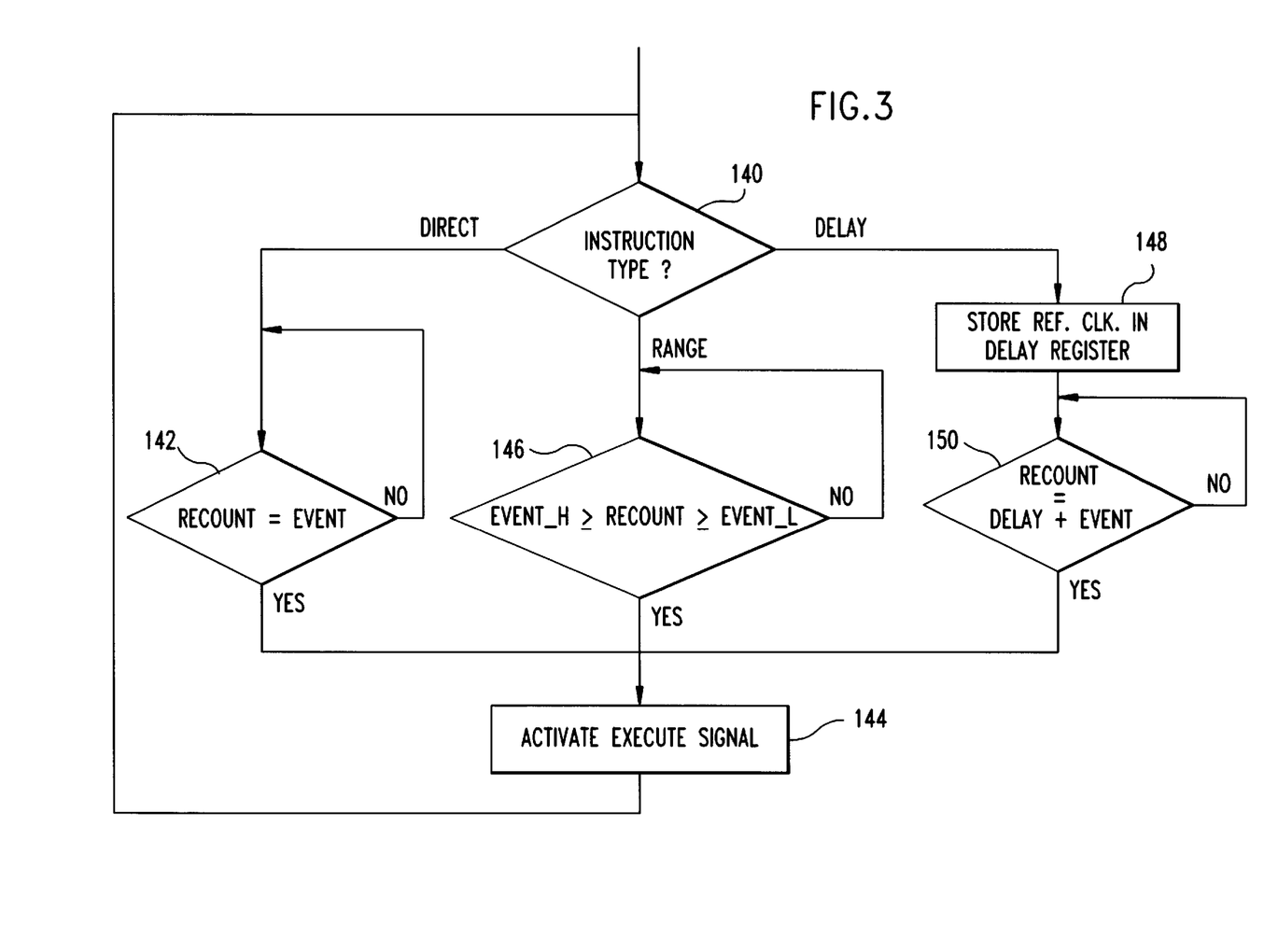
FIG. 3 is a flow chart of comparator operation.

FIG. 3 is a flow chart of comparator 124 operation. When an eventstamped instruction is received, on each cycle of master clock 122, in step 140, the comparator 124 checks the TYPE field 128 to determine the type of eventstamp, i.e., Direct, Range or Delay. Preferably, the instruction TYPE field 128 is a two bit field that indicates the type of eventstamp. The Instruction type determines the decision path is followed.

If, in step 140, the eventstamp type is Direct, then in step 142, the RE count of Reference Event Counter 120 is compared to the EVENT field 130. If the comparison shows that the RE count is not equal to the EVENT field 130, the check is repeated until they are equal, When they are equal, the Execute Signal 132 is activated in step 144.

If, in step 140, the eventstamp type is Range, then in step 146, the RE count of Reference Event counter 120 is compared to two components of the EVENT field 130 providing an upper range limit (EVENT_H) and a lower range limit (EVENT_L). If the RE count is not between the range limits, the processor pauses, looping in step 146 until the count reaches one limit or the other. Once the count is between the range limits, the Execute Signal 132 is activated in step 144.

If however, in step 140, the eventstamp type is Delay, then in step 148, the RE count value in the Reference Event counter 120 is stored in a DELAY register (not shown) in the comparator 124. An event delay offset from the EVENT field 130 is added to the stored value, providing an event delay count. Then, in step 150, the processor pauses, looping until the event count reaches the event delay count. Once the count reaches thee delay count, the Execute Signal 132 is activated in step 144. The Execute Signal 132 causes the MPCU 104 to execute the eventstamped instruction.

Figure 4:
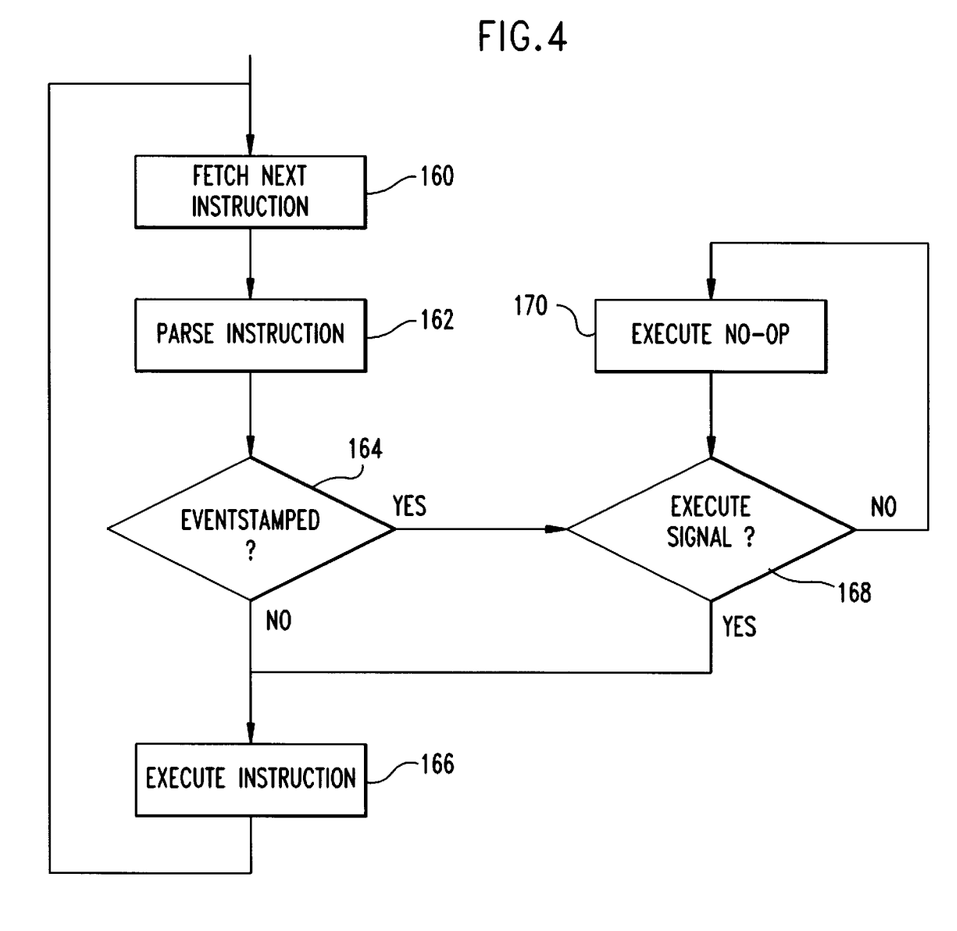
FIG. 4 is a flow chart of the MPCU operation.

FIG. 4 is a flow chart of MPCU 104 operation. First, in step 160, the MPCU 104 fetches an instruction from the memory 102. In step 162, the instruction is parsed and, in step 164, the instruction is checked for an eventstamp. If the instruction is not eventstamped, then in step 166 the instruction is executed. Otherwise, if the instruction is eventstamped, then in step 168, the Execute Signal is tested. If the Execute Signal is not active, then in step 170, a delay is inserted by executing a No-op. After the No-op, in step 168, the Execute Signal is tested again. When the Execute Signal is found to be active in the test of step 168, then, in step 166, the instruction is executed.

Figure 5:
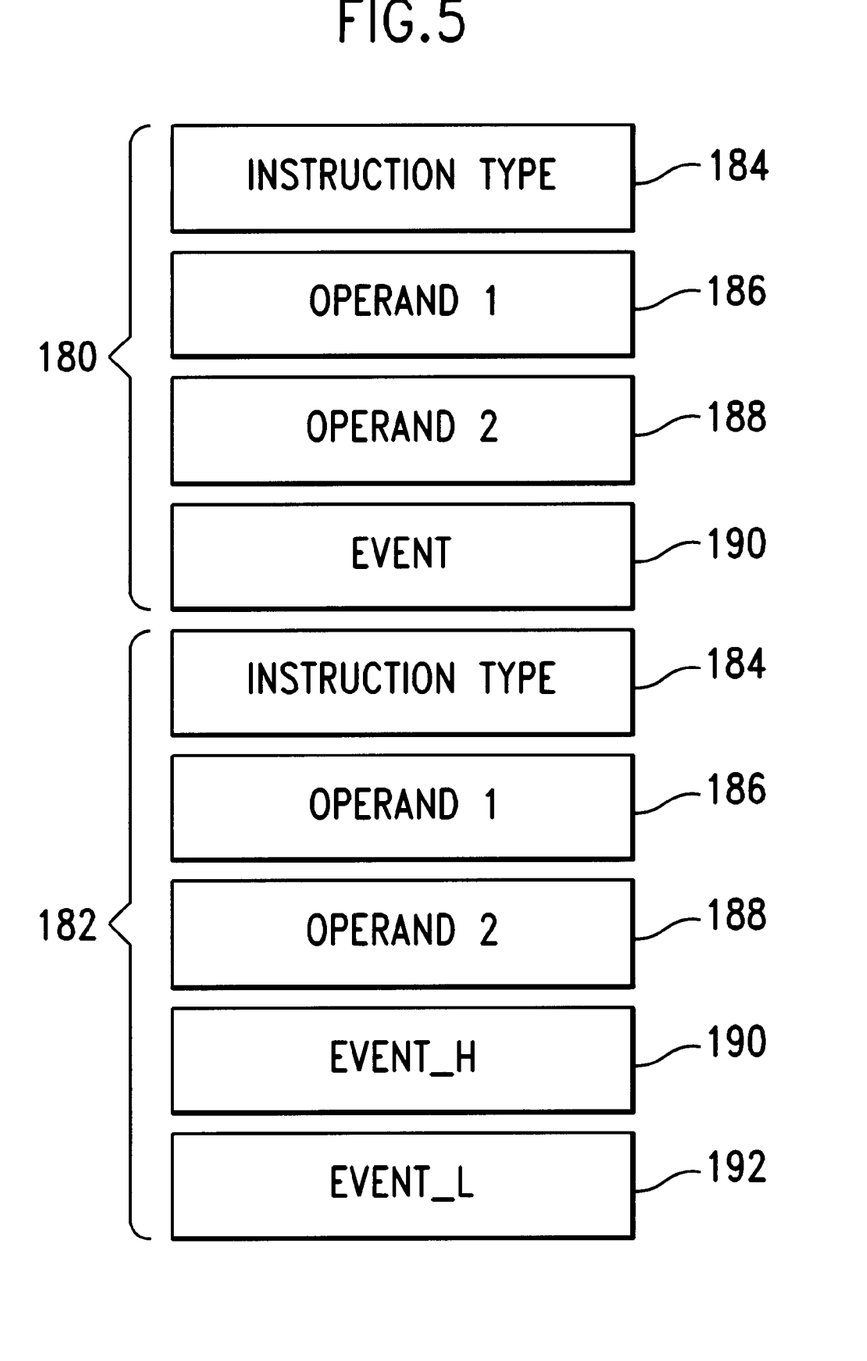
FIG. 5 shows the fields of two eventstamped instructions.

FIG. 5 shows the fields of two eventstamped instructions 180, 182. The first field of each instruction 180, 182 is the Type Field 184 that indicates the type of operation to be performed and whether the particular instruction is eventstamped. The immediately following fields of a eventstamped instruction 180, 182 are the operand fields 186, 188, providing the operation to be performed. The last field in a eventstamped instruction 190, 192 is(are) the Event field(s) 190(, 192). The first instruction 180, which is a Direct or Delay eventstamped instruction, includes a single number in a single Event field 190. The second instruction 182, which is a Range eventstamped instruction, includes a pair of number in Event fields 190, 192.

In an alternate embodiment, Reference Event Counter 120 is omitted and events are counted externally. In this embodiment, the RE count is provided directly to the comparator 124. The externally supplied RE count may be a numerical count or, alternately, a number.

Figure 6:
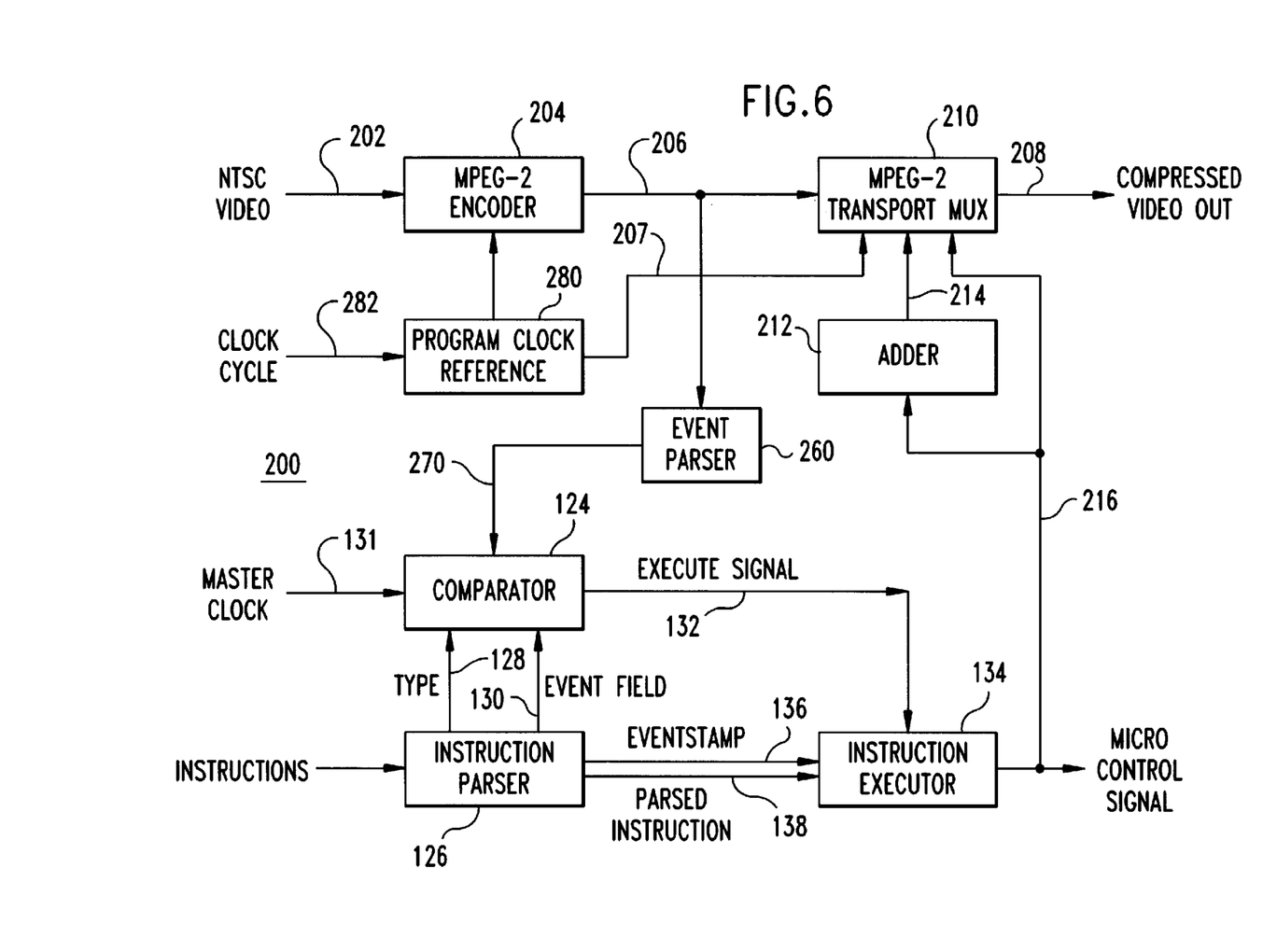
FIG. 6 is an example of a data broadcasting subsystem for Digital Television according to the preferred embodiment of the present invention.
Figure 7:
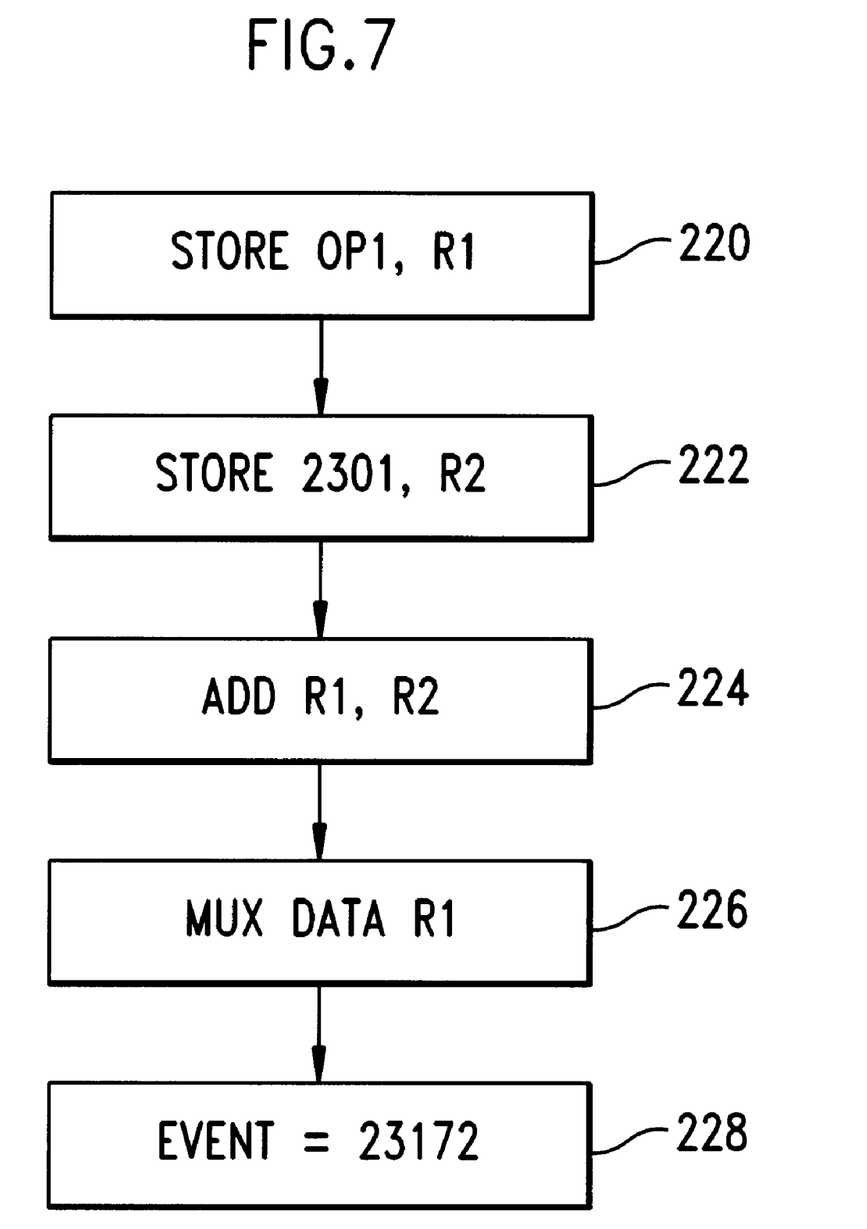
FIG. 7 shows representative steps encoding broadcast data in the Digital Television example of FIG. 6.

FIG. 6 is an example of a data broadcasting subsystem 200 for Digital Television according to the preferred embodiment of the present invention including a MPCU 104 as in FIG. 2 with like elements labeled as in FIG. 2. FIG. 7 shows representative steps in encoding broadcast data in the Digital Television example of FIG. 6 according to the preferred embodiment of the present invention.

In this Digital Television embodiment example, NTSC video signals at input 202 are encoded in Motion Picture Experts Group—second version (MPEG-2) encoder 204 providing compressed video at output 206. MPEG-2 is a well known standard in the art. As the video is compressed in MPEG-2 encoder 204, the Program Clock Reference 280, clocked by a reference clock 282, provides Program Clock References (PCR) 207, i.e., time synchronized data or information, that are inserted, periodically, into the output compressed video stream output 208 at the proper time.

MPEG-2 encoder 204 is continuously compressing video signals 202 and providing the results 206 to MPEG-2 transport Mux 210. Simultaneously, MPCU 104 is executing the program of FIG. 7 to generate synchronized information (or data) to be embedded in the encoded output 208. Adder 212 generates this data by combining data from registers or memory and the result 214 is provided to MPEG-2 transport Mux 210 in response to control from µCS 216

In this embodiment, an event parser 260 extracts the event count directly from the compressed video stream 206. The event count for this embodiment is a current frame number or video frame count. The event count is passed to the comparator on Count BUS 270.

Thus, with reference to FIG. 7, in step 220, a first operand, Operand 1 is stored in a first register, Register R1. Next, in step 222, a random number, 2301 in this example, is stored in a second register, Register R2. Then, in step 224, Adder 212 adds the data stored in MCPU Registers R1 and R2 (not shown) and, stores the result in Register R1. In step 226, the previously stored result in Register R1, is inserted into the compressed data as it is passes through MPEG-2 transport Mux 210 according to the instruction's event field, 23172 in this example. Thus, when the frame number equals 23172 the result is inserted.

When each new instruction is provided, the Instruction Parser 126 sends the instruction TYPE. 236 and the Event Field(s) 130 to the Comparator 124. The Comparator 124 continuously compares the event count to the Event Field(s) 120 and generates an Execute Signal 132, when they are equal. The Instruction Executor 134 responds to the Execute Signal 132 by generating the appropriate Micro Control Signals. As a result, the MPEG-2 Mux 210 inserts the synchronized data into the compressed video stream output 208.

While the invention has been described in terms of preferred embodiments those skilled in the art will recognize that the invention can be practiced with modification within the spirit and scope of the appended claims.

I claim:

1. An event controlled processor for a data processing system, said event controlled processor comprising:
    an event input receiving an event signal generated by event occurrences;
    an event counter counting said event occurrences;
    an instruction parser, receiving instructions, and parsing an event related instruction execution time from said received instructions;
    a comparator comparing an event count from said event counter with said event related instruction execution time; and
    an instruction unit causing instructions to be executed responsive to said comparator.

2. A processor, as in claim 1, wherein the instruction parser parses an instruction type and at least one event field, said instruction type indicating a relationship between said count and each said at least one event field.

3. A processor, as in claim 2, wherein said instruction type is a range type and said at least one event field is a pair of event fields indicating a range of event occurrences.

4. A processor, as in claim 2, wherein said instruction type is a direct type and said at least one event field is a single field indicating an event triggering instruction execution.

5. A processor, as in claim 2, wherein said instruction type is a relative type and said at least one event field is a single field indicating a delay, said delay being a number of additional events to occur prior to instruction execution.

6. A processor, as in claim 2, wherein said processor is a microprocessor.

7. A processor, as in claim 2, wherein when said instructions are executed, data is inserted into a data stream responsive to occurrence of an event.

8. A processor, as in claim 7, wherein said processor is a digital signal processor.

9. A method of synchronizing a processing unit in a computer system to external events, said processing unit directly receiving event occurrence signals responsive to said external events, said method comprising;
    fetching an instruction;
    checking said instruction for an instruction type; and
    executing said instruction in response to an occurrence of an event at a time determined by said instruction type and an event field in said instruction.

10. A method as in claim 9 further comprising:
maintaining an event occurrence count, said instruction being executed further in response to said event occurrence count.

11. A method as in claim 10 wherein when said instruction type is a direct type, said event occurrence count being provided by said event field.

12. A method as in claim 10 wherein when said instruction type is a relative type, said event occurrence count being delayed from a current event occurrence count by a number of event occurrences determined by said event field.

13. A method as in claim 10 wherein when said instruction type is a range type, said event occurrence count being a range of occurrences, said range being determined by said event field.

14. A method as in claim 10 wherein when said instruction is found to not include an event type, said instruction is executed immediately.

15. A microprocessor for a video processing comprising:
an MPEG encoder receiving a video signal, encoding said received signal as MPEG encoded data;
an event parser receiving said MPEG encoded data and parsing event occurrence information from said received MPEG encoded data;
an MPEG transport mux receiving said MPEG encoded data; and
a microprocessor control unit, said MPEG transport mux passing said encoded data responsive to said microprocessor control unit, said microprocessor control unit comprising:
an event input receiving parsed said event occurrence information from said event parser,
an instruction parser, receiving instructions, and parsing an event related instruction execution time from said received instructions,
a comparator comparing received said parsed event occurrence information with said event related instruction execution time, and
an instruction unit causing instructions to be executed responsive to said comparator.

16. A microprocessor as in claim 15, wherein the instruction parser parses an instruction type and at least one event field, said instruction type indicating a relationship between said count and each said at least one event field.

17. A microprocessor as in claim 16, wherein said event signal is a clock signal.

18. A microprocessor as in claim 17, wherein the event parser parses an eventstamp from said encoded data.

19. A microprocessor as in claim 18, wherein said instruction type is a range type and said at least one event field is a pair of event fields indicating a range of event occurrences.

20. A microprocessor as in claim 19, wherein one of said pair is an earliest time at which to execute said instructions and, the other of said pair is a latest time at which to execute said instructions.

21. A microprocessor as in claim 18, wherein said instruction type is a direct type and said at least one event field is a single field indicating a parsed eventstamp triggering instruction execution.

22. A microprocessor as in claim 18, wherein said instruction type is a relative type and said at least one event field is a single field indicating a delay, said delay being a number of events to occur prior to instruction execution.

23. A microprocessor as in claim 18, wherein the microprocessor further includes at least one functional unit.

24. A microprocessor as in claim 23, wherein at least one functional unit further includes at least one logic unit.

* * * * *

UNITED STATES PATENT AND TRADEMARK OFFICE
CERTIFICATE OF CORRECTION

PATENT NO. : 6,292,887 B1
DATED : September 18, 2001
INVENTOR(S) : Janniello

It is certified that error appears in the above-identified patent and that said Letters Patent is hereby corrected as shown below:

Column 1,
Line 21, delete "," and substitute therefore -- . --;
Line 47, after "fetches" insert -- , --;
Line 55, after "instances" insert -- , --;

Column 2,
Line 3, after "important" insert -- , --;
Line 9, delete "he" and substitute therefore -- be --;
Line 14, after "essentially" insert -- , --;

Column 3,
Line 20, after "steps" insert -- in --;
Line 31, "passe" should be -- passed --;

Column 4,
Line 60, after "If" insert -- , --;

Column 6,
Line 9, delete "." after "TYPE"; and
Line 62, delete ";" and substitute therefore -- : --.

Signed and Sealed this

Fifth Day of March, 2002

*Attest:*

JAMES E. ROGAN
*Attesting Officer*   *Director of the United States Patent and Trademark Office*